F. O. AND P. A. LINSTROM.
HEADLIGHT FOR VEHICLES.
APPLICATION FILED APR. 24, 1918.
1,392,424.
Patented Oct. 4, 1921.
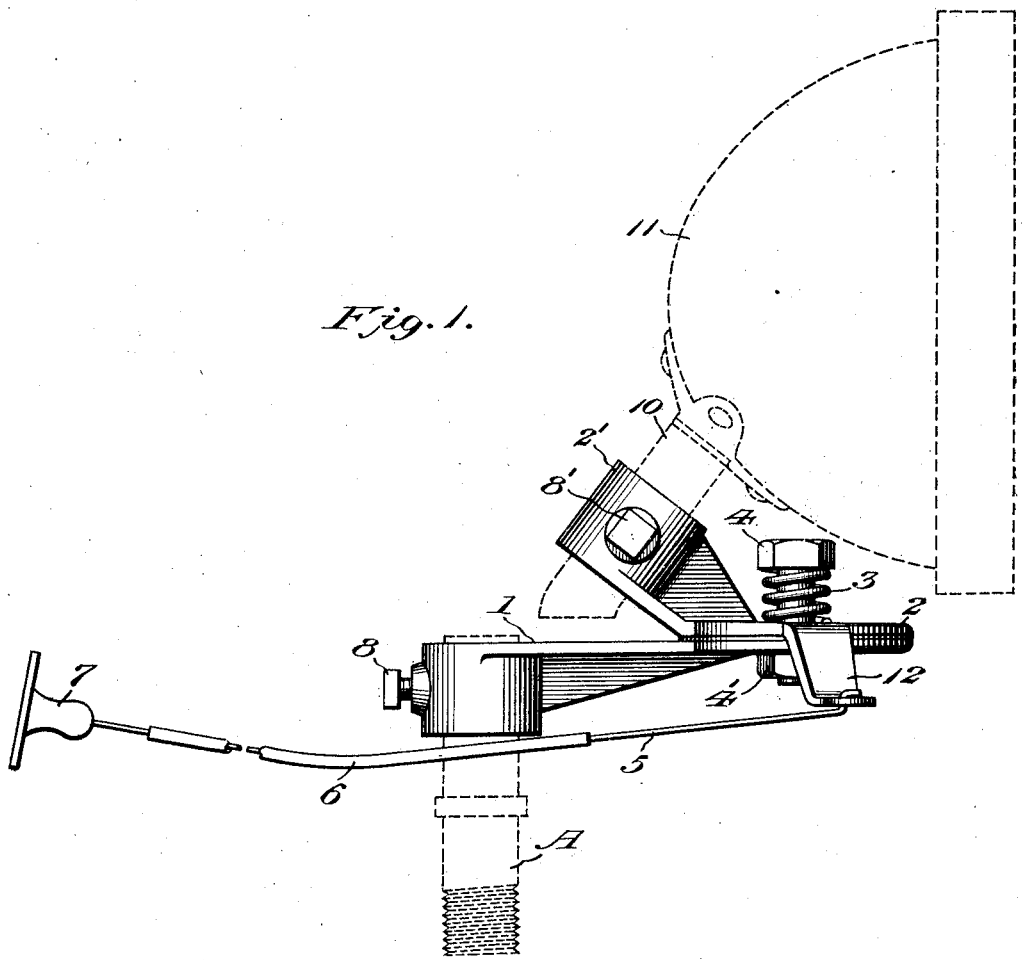
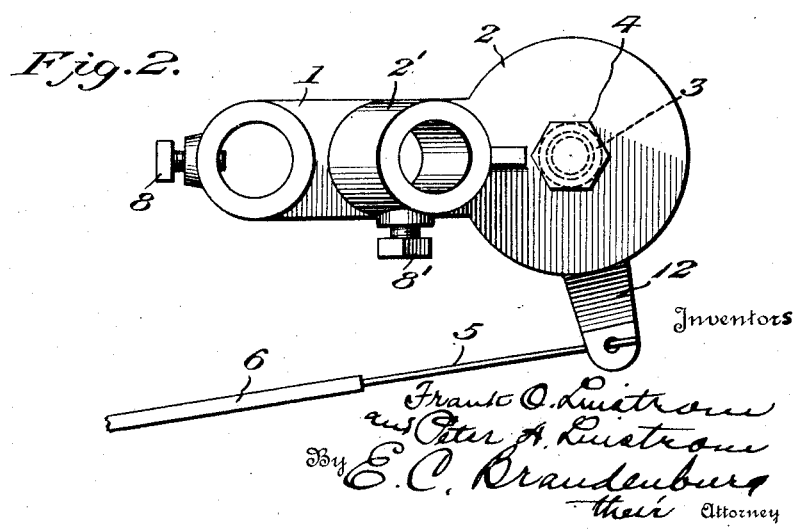

UNITED STATES PATENT OFFICE.

FRANK O. LINSTROM, OF WATERTOWN, AND PETER A. LINSTROM, OF CASTLEWOOD, SOUTH DAKOTA.

HEADLIGHT FOR VEHICLES.

1,392,424.   Specification of Letters Patent.   Patented Oct. 4, 1921.

Application filed April 24, 1918. Serial No. 230,426.

*To all whom it may concern:*

Be it known that we, FRANK O. LINSTROM and PETER A. LINSTROM, citizens of the United States of America, residing at Watertown, Codington county, South Dakota, and at Castlewood, Hamlin county, South Dakota, respectively, have invented certain new and useful Improvements in Headlights for Vehicles, of which the following is a specification.

This invention relates to an improvement in head lights for vehicles and the purpose is to arrange one of the lights of the vehicle so that it may be turned in any part of the road or along the side of the road and still be used as one of the regular head lights of the vehicle.

In the accompanying drawings:

Figure 1 is a view in side elevation.

Fig. 2 is a plan view.

The numeral 1, represents a bracket removably secured to the upper end of the lamp post A, shown in dotted lines in Fig. 1 by a set screw or similar means 8.

The numeral 2 is a plate a portion of which is circular in form and fashioned to fit and turn like the fifth wheel on the outer end of the bracket 1, and a bolt 4 passes through a coil spring 3 and through central holes in the bracket 1 and plate 2 to hold the latter pivotally supported thereon, the spring 3 exercising the required tension to hold the parts in easy frictional turning contact, and the nut 4' on the bolt may be screwed on the threaded end of the latter to a position to regulate the tension of the spring 3.

A socket 2', is formed at the upper end of the plate 2, and this receives the shank 10 of the lamp 11, both shown in dotted lines in Fig. 1. A set screw or other means 8' holds this shank adjusted in place in the socket.

An arm 12, extends laterally from the plate 2, and from this a spring wire 5, passing through the tube 6 extends to a button 7, which is directly in front of and in easy reach of the operator.

By this simple means an attachment is provided for any form of automobiles for supporting and turning the light at the will of the operator and into any position, on any part of, or along the side of, the road while at the same time it is repeated the light, when not used as a search-light, constitutes one of the regular head lights of the vehicle.

We claim:

A vehicle light comprising a bracket with means for removably securing it on its support, one end of the bracket extended horizontally to form an enlarged flat circular bearing, a plate of corresponding form and adapted to fit the enlarged bearing of the bracket, a bolt extended through the centers of said parts, a spring thereon, means on the bolt for drawing the bolt through the parts and applying tension to the spring, whereby said parts are held pivotally together and in yielding turning contact, the plate having a socket formed on the upper end thereof, a lamp having a shank fitted to the socket, a set-screw in the socket for holding the shank of the lamp adjustably therein, an arm extending from said plate, and means within reach of the operator connected with said arm, whereby to turn the plate axially with the bolt as a pivot to reflect the light in various directions horizontally.

In testimony whereof we affix our signatures.

FRANK O. LINSTROM.
PETER A. LINSTROM.